United States Patent [19]

Jones et al.

[11] Patent Number: 4,831,829
[45] Date of Patent: May 23, 1989

[54] KRYPTON BASED ADSORPTION TYPE CRYOGENIC REFRIGERATOR

[75] Inventors: Jack A. Jones, Los Angeles; Helene R. Schember, Tujunga, both of Calif.

[73] Assignee: The United States of America as represented by the Administrator of the National Aeronautics and Space Administration, Washington, D.C.

[21] Appl. No.: 149,821

[22] Filed: Jan. 29, 1988

[51] Int. Cl.[4] .............................................. F25J 3/04
[52] U.S. Cl. ........................................ 62/22; 62/48.1; 62/467
[58] Field of Search ..................... 62/18, 22, 48, 467

[56] References Cited

U.S. PATENT DOCUMENTS 4,417,909 11/1983 Weltmer, Jr. ........................... 62/22
4,697,425 10/1987 Jones ................................... 62/467

OTHER PUBLICATIONS

AIAA'87, "Oxygen Chemisorption Compressor Study for Cryogenic J-T Refrigeration", J. A. Jones et al., Jun. 8–10.

Primary Examiner—Ronald C. Capossela
Attorney, Agent, or Firm—Thomas H. Jones; Paul F. McCaul; John R. Manning

[57] ABSTRACT

Krypton and a monolithic porous carbon such as Saran carbon are used respectively as the sorbate and sorbent of an adsorption type refrigerator to improve refrigeration efficiency and operational longevity.

13 Claims, 2 Drawing Sheets

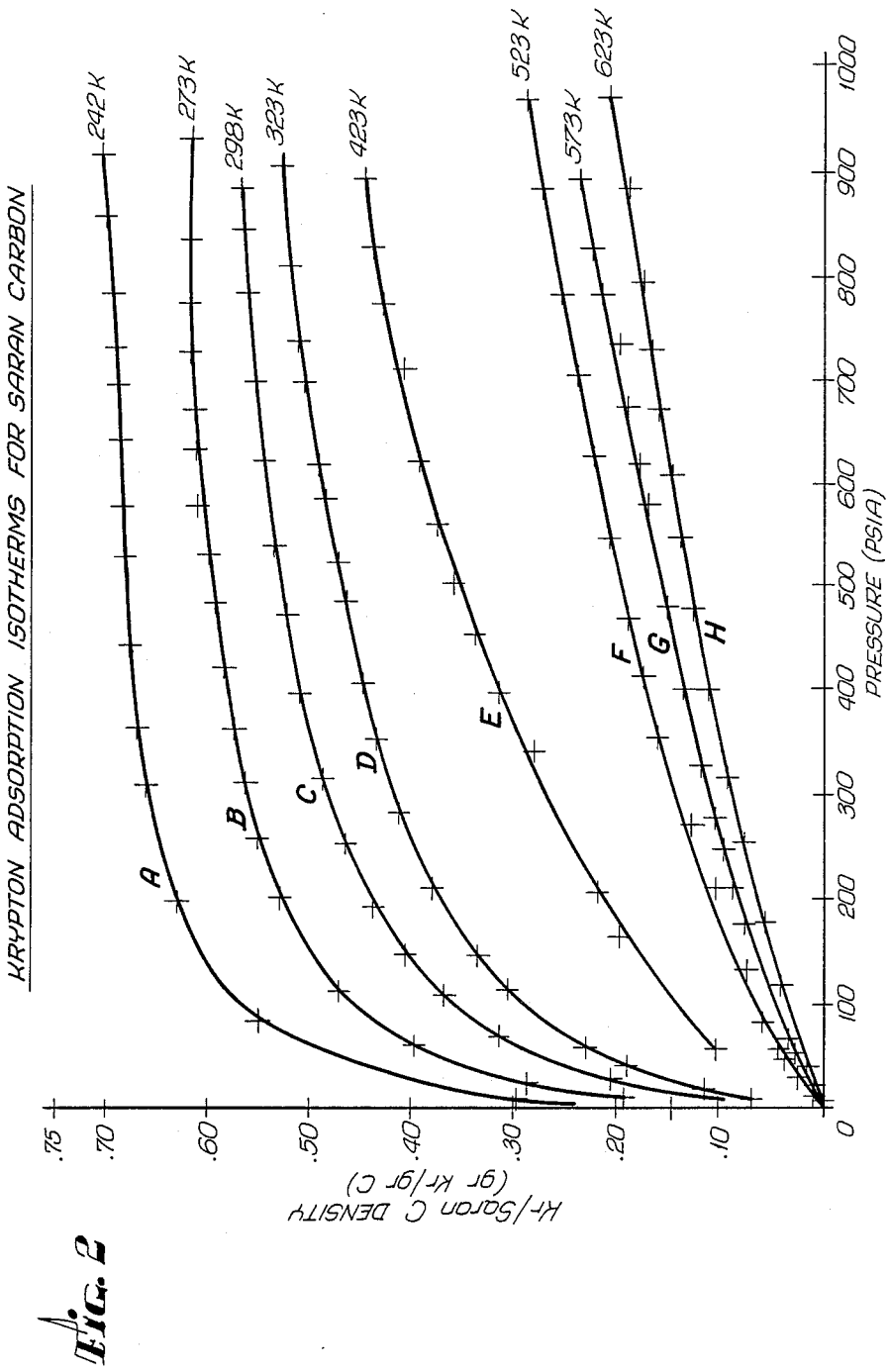

ic involved here but the invention is not limited to any particular theory.)

KRYPTON BASED ADSORPTION TYPE CRYOGENIC REFRIGERATOR

ORIGIN OF THE INVENTION

The invention described herein was made in the performance of work under a NASA contract and is subject to the provisions of Public Law 96-517 (35 USC 202) in which the Contractor has elected not to retain title.

BACKGROUND OF THE INVENTION

1. Field of the Invention

The present invention is directed generally to cryogenic refrigerators and more specifically to adsorption type refrigeration systems in which a low pressure refrigeration fluid is adsorbed by the surface of a sorbent material and then pressurized by heating the sorbent material.

2. Description of the Prior Art

Adsorption type refrigerators can pressurize a refrigeration fluid such as methane gas ($CH_4$) without using a reciprocating piston or other moving compression means. Because fewer moving parts are required for such refrigeration systems, the systems exhibit relatively long lifetimes (e.g. ten years or more) and usually operate with little or no mechanical vibration. The lack of mechanical vibration is particulary advantageous when sensitive transducers need to be cooled without being disturbed by vibrations.

The operation of an adsorption type refrigerator can be summarized as follows. A refrigeration fluid is precooled and adsorbed onto the cavity walls of a porous adsorption material, at a first temperature. Charcoal is often used as the adsorption material. The sorbent (charcoal) and sorbate (methane) are then heated to a higher second temperature while the sorbate is trapped in the sorbent. The pressure of the trapped sorbate rises with the temperature as the sorbate is driven off the sorbent surface. An outlet valve is opened to direct the pressurized sorbate away from the sorbent to the high pressure side of a high pressure/low pressure orifice. Heat is absorbed (and cooling takes place) when the pressurized sorbate (refrigeration fluid) expands into the low pressure side of the orifice.

Methane gas has been the material of choice for cooling to temperatures in the range of approximately 140 degrees Kelvin (K). Methane is selected because it can be preliquefied at a temperature above 140 K but below its critical temperature of 190.7 K. Refrigeration efficiency is believed to be enhanced by preliquefying the refrigeration fluid before passing it through an expansion orifice. The use of methane poses a number of problems however, including: (a) the danger of an explosion occurring if the methane is accidentally exposed to oxygen or other reactive chemicals; (b) an undesirable tendency of methane to slowly decompose and/or react with other materials to thereby deplete the system of its working fluid while also contaminating the surfaces of the absorption material with elemental carbon and hydrogen or blocking pores in the sorbent material with large molecules; and (c) the association of methane with refrigeration efficiencies that are relatively poor in comparison to the efficiencies of other refrigeration fluids. Refrigerants such as Freon 14, ethylene, and nitrous oxide have been found to pose some if not all of these problems to a certain degree.

SUMMARY OF THE INVENTION

In accordance with the present invention, krypton is used in conjunction with a suitable solid sorbent to overcome problems associated with methane. Saran carbon is preferred as the sorbent material.

BRIEF DESCRIPTION OF THE DRAWINGS

FIG. 2 illustrates adsorption density isotherm curves for the adsorption of krypton onto the surface area of a saran carbon sorbent.

DETAILED DESCRIPTION OF THE INVENTION

Figure 1:
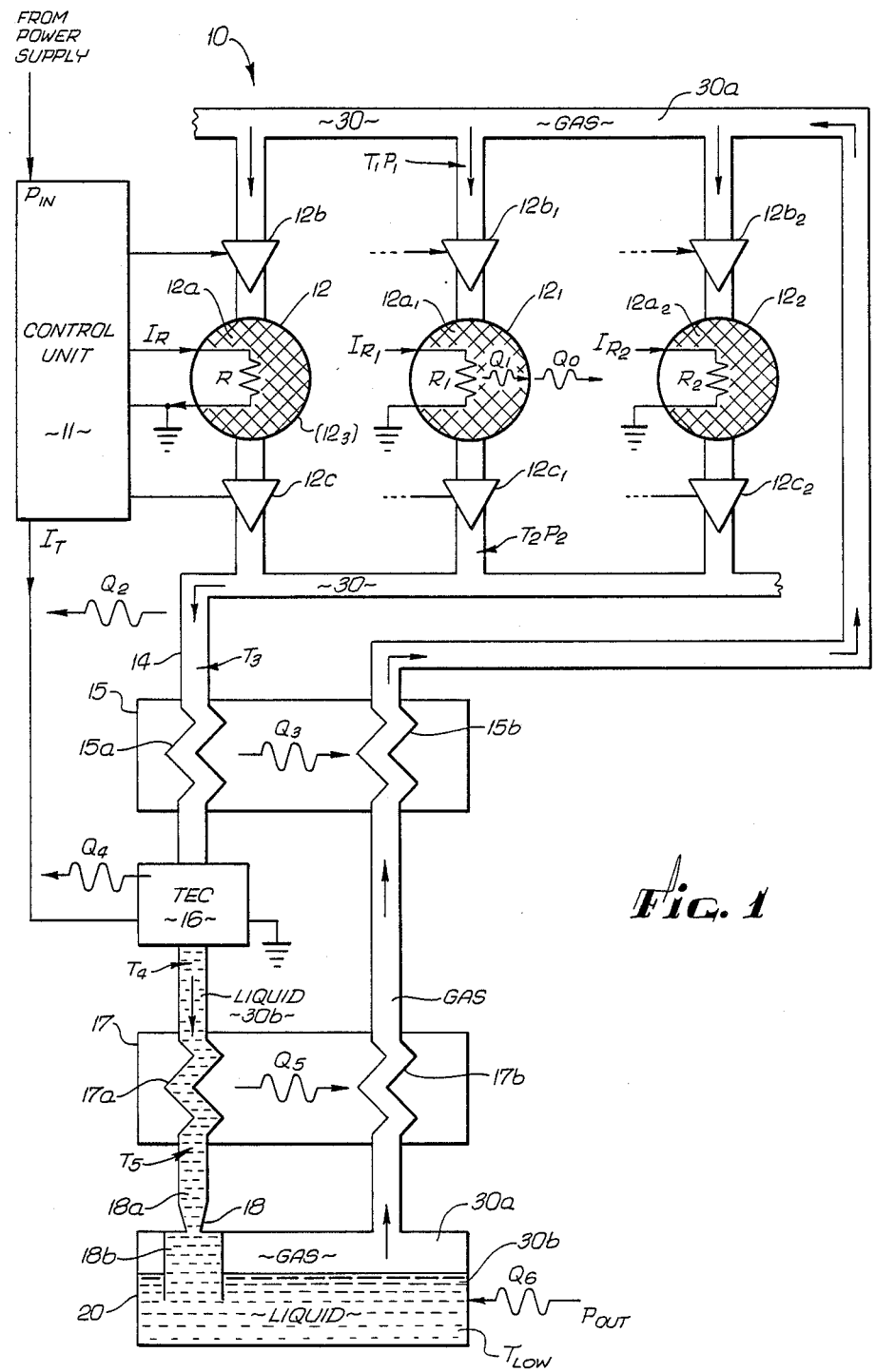
FIG. 1 is a flow diagram of a krypton based adsorption refrigeration system in accordance with the present invention.

The following description is of the best presently contemplated mode for carrying out the present invention. It is to be understood that this description is provided for the purpose of illustrating the general principles of the invention and not for the purpose of limiting the scope of the invention. The scope of the invention is better defined by reference to the accompanying claims.

FIG. 1 is a flow diagram of a krypton based refrigeration system 10 in accordance with the present invention. The system 10 comprises a bank of adsorption chambers 12, each containing a mass of sorbent material 12a, such as charcoal or more preferably a monolithic porous carbon such as saran carbon type A (the inert pyrolysis product of essentially 100% polyvinylidene chloride, PVDC); and each having respective inlet and outlet check valves, 12b and 12c. The outlet valves 12c are connected to a first side 15a of a first heat exchanger 15 by means of a passive heat radiating pipe 14. The first heat exchanging side 15a couples as shown to a thermoelectric cooler (TEC) 16 and, thereafter, in series to a first side 17a of a second heat exchanger 17 and the high pressure side 18a of a Joule-Thompson (J-T) valve 18. The low pressure side 18b of the J-T valve 18 is connected in series back to the bank of adsorption chambers 12 through a liquid/gas transition chamber 20, a second side 17b of the second heat exchanger 17, and a second side 15b of the first heat exchanger 15. Numerous structures can be employed for forming the first and second heat exchangers. The preferred embodiment presently comprises two tubes joined together with a bimetallic TEC being formed at a central portion of the high pressure tube.

A refrigeration fluid 30 which includes a substantial amount of krypton (Kr), and which more preferably consists essentially of krypton, flows through the system 10 in the following manner. At the inlet valves 12b of the adsorbtion chambers 12, the fluid 30 is maintained at a first temperature $T_1$ of for example, approximately 275 K and a first pressure $P_1$ of for example, approximately 4 atmospheres. A substantial portion 30a of the fluid 30 (preferably all of it) is in the gaseous phase at this point. The inlet valve $12b_1$, of a preselected one $12_1$ of the adsorbtion chambers 12 is opened to let the fluid 30 into the selected chamber $12_1$. The corresponding outlet valve $12c_1$ of that selected chamber is closed at this time. The fluid 30 is adsorbed by the sorbent material $12a_1$ of the selected chamber $12_1$ and a substantial portion of the fluid adheres onto the surface area of the sorbent material either by physisorption or chemisorption. (Physisorption is believed to be the primary mechanism for the adherence of krypton to carbon based surfaces.)

After a predetermined length of time and/or a predetermined amount of the fluid is adsorbed, the inlet valve $12b_1$ is closed. The temperature of the newly-filled chamber $12_1$ is raised to a second temperature $T_2$ of approximately 575 K by introducing a first amount of heat $Q_1$ into the chamber $12_1$. The heat $Q_1$ can be generated by passing an electric current $I_R$ through an electric heating rod $R_1$ disposed centrally within the chamber $12_1$ as shown or by any other suitable means. One contemplated method is to use the resistivity of the sorbent material as a direct means for heating the adsorbed fluid. The electrical current $I_R$ is conducted directly through the sorbent material to generate heat. Another method is to use the sorbent material $12a$ (preferably a monolithic carbon) as a heat conducting matrix for transferring heat from an external source to the sorbed working fluid 30. The temperature increase due to heating drives off the working fluid from the sorbent surface and raises the pressure of the fluid 30 (sorbate) from the first pressure $P_1$ (of approximately 4 atm) to a higher second pressure $P_2$ of for example, 36.8 atmospheres.

Once the selected adsorbtion chamber $12_1$ is pressurized to a desired second pressure $P_2$, its outlet valve $12c_1$ is opened automatically and the pressurized fluid 30 is routed through the heat radiator 14 to the first heat exchanger 15, the thermoelectric cooler 16, and the second heat exchanger 17. In a simple system, the outlet valves $12c$ can be designed to each open at a predetermined pressure, (e.g. 36.8 atm) by means of a preselected check valve spring (not shown). A more complex system may use an electronic control unit 11, in operative conjunction with a set of check valve springs or without, to set the opening and closing times and/or temperatures of each inlet and outlet valve and to selectively apply heating currents $I_R, I_{R1}, I_{R2}, \ldots$, to resistive elements $R, R_1, R_2 \ldots$, in the respective pressurization chambers $12, 12_1, 12_2 \ldots$.

The chambers 12 are preferably cooled to a temperature substantially below $T_2$ (e.g. well below 575 K) after the pressurized fluid leaves the chambers by removing a residual heat $Q_o$ therefrom with a suitable cooling means (not shown). A simple flowing water jacket can be used for selective cooling of the chambers. In space borne applications it is contemplated to use a convective gas gap which is selectively filled with a heat conducting gas like nitrogen or carbon dioxide when heat $Q_o$ is to be removed and is evacuated when heat $Q_1$ is being supplied by the electrically resistive means $R_1$.

After the fluid leaves the chambers 12 and as the fluid 30 moves through the heat radiator 14, the fluid releases a second amount of heat $Q_2$ thereby causing the temperature of the fluid 30 to drop to an above-critical second temperature $T_3$ of for example approximately 275 K (this temperature being selected to be above the critical temperature of krypton). In the first heat exchanger 15, the fluid 30 gives up a third quantity of heat $Q_3$ to the second side $15b$ of the first heat exchanger. The third heat $Q_3$ recuperatively warms fluid in the second side $15b$ to approximately 275 K as will be explained later.

The thermoelectric cooler 16 is supplied with a TEC driving electric current $I_T$ to drive the temperature of the fluid 30 to a below-critical fourth temperature $T_4$ of, for example, approximately 195 K by extracting a fourth quantity of heat $Q_4$ from the fluid. $T_4$ is preferably preselected to be between 190 K and 209 K; and more preferably centered around or above 200 K. This TEC heat extraction step changes the krypton in the fluid 30 from a gaseous phase $30a$ to a liquid phase $30b$. As will be noted later, the selection of the fourth temperature $T_4$ plays a key role in determining the energy efficiency of the TEC and the system 10 as a whole. The critical temperature for krypton at 36.8 atm is roughly 209.4 K.

A fifth quantity of heat $Q_5$ is removed from the fluid 30 when the liquid flows through the first side $17a$ of the second heat exchanger 17. The latter heat extraction step preferably brings the fluid down to a subcritical fifth temperature, $T_5$ of approximately 120 K–209 K and more preferably to about 140 K–190 K.

When the fluid 30 reaches the high-pressure side $18a$ of the J-T valve 18, its pressure is still at approximately 36.8 atmospheres ($P_2$). As the fluid 30 passes through the orifice of the J-T valve 18, its pressure drops to a low pressure level $P_{low}$ of, for example, approximately four atmospheres and its temperature preferably drops to a low temperature $T_{low}$ of approximately 120–160 K, and more preferably 140 K; the latter being a preferred temperature for precooling an oxygen chemisorption refrigerator. A substantial amount of the krypton component of the fluid 30 should be primarily in the liquid phase $30b$ at this low temperature although some of the fluid 30 becomes gassified as a result of passing through the J-T valve. The liquified component $30b$ is collected into the liquid/gas transition chamber 20 (e.g., a dewar flask having a heat inlet portion). A sixth quantity of heat $Q_6$ is absorbed by the transition chamber 20 causing the liquified component $30b$ to begin reverting back to the gaseous phase $30a$. The rate at which the sixth heat quantity $Q_6$ can be absorbed from a to-be-cooled heat source (refrigeration load) determines the cooling power $P_{out}$ of the refrigeration system 10. The complimentary input power $P_{in}$ of the system is determined primarily by the energy requirements of the adsorption chamber heaters R and the TEC (input currents $I_R$ and $I_T$).

After leaving the transistion chamber 20, the temperature of the fluid 30 is then raised from the low temperature $T_{low}$ of approximately 140 K to the first temperature $T_1$ of approximately 275 K by passing the fluid 30 through the second sides, $17b$ and $15b$, of the second and first heat exchangers, respectively. By the time the fluid 30 reaches the adsorption chambers 12, the fluid is substantially gassified and therefore readily able to flow into pores or surface cavities of the sorbent material $12a$. The fluid is adsorbed onto the surfaces of the sorbent material in one of the chambers 12 and the cycle of heating the filled chamber to pressurize the fluid, and so on, is then repeated.

The plural adsorption/pressurizing chambers 12 are preferably operated in staggered fashion so that, while a first of the chambers $12_1$ is taking in a first amount of precooled low-pressure fluid 30 through its respective inlet valve, $12b_1$, a second of the chambers $12_2$ can be outputting a second amount of pressurized fluid from its corresponding outlet valve $12c_2$, and a third of the chambers ($12_3$) can be absorbing the first heat $Q_1$ to raise the temperature and pressure of the refrigeration fluid 30 contained therein. As such, a generally continuous flow of fluid 30 can be maintained through the system 10 to thereby provide a generally constant refrigeration capacity.

The comparison of one refrigeration system to the next is a difficult task because a large number of parameters can come into play. Some of the parameters usually considered are: cost, size, operating temperatures, energy efficiency, absolute cooling power, mean time between maintenance (MTBM), and potential interactions with other systems in the operating environment of the refrigeration system. Typically, energy efficiency is used as a rudimentary comparison tool for evaluating systems of different configurations. Energy efficiency can be expressed as a specific power factor, $S_p = P_{in}/P_{out}$, which indicates how much power needs to be pumped into the system (e.g. system 10 of FIG. 1) to obtain one comparable unit of cooling power (e.g. Watts in/Watts out). Systems having higher specific power factors can be said to be less energy efficient than those with lower specific power factors. If one takes into balance cost factors such as the MTBM and the danger of a destructive explosion occuring, the importance of the specific power factor may become significantly diminished. This is particularly the case for remote cooling applications such as cryogenic freezing on board a space satellite.

Comparative experiments were conducted with a number of refrigerants, including methane and krypton. A number of different absorbent materials, including granular charcoal and monolithic porous carbons such as saran carbon, were also studied to determine which configuration was best suited for an environment requiring a high MTBM and a relatively low specific power $S_p$. The particular environment in mind is that of the precooling stage for an oxygen based chemisorption refrigerator on board a space satellite. The oxygen stage is desirably precooled to 120–160 K and more preferably to a temperature substantially below the 150 K critical point of oxygen. A temperature of approximately 140 K has been found well suited for liquifying oxygen before moving it to subsequent parts of the chemisorption refrigerator.

A first study was conducted to find potential refrigerants other than methane which will not solidify in the range 120–160 K and which can provide efficient cooling in that temperature range. A second study was conducted to find optimal adsorption materials for these refrigerants.

Table 1 (below) shows the results of the latter study wherein computer modelling was used to calculate comparative specific powers for different sorbents. The working fluid wa in all instances selected to be methane ($CH_4$), the refrigeration system was computer modelled to the configuration shown in FIG. 1, the J-T low pressure side 18b was set to have a low temperature $T_{low}$ of 140 K, and the TEC temperature, $T_4$ was set at 190 K in order to assure that the methane working fluid will be cooled to below its critical temperature of 190.7 K as it enters the J-T valve. Those skilled in the art will appreciate that a significant amount of energy efficiency is lost by operating the TEC 16 below roughly 200 K. Bimetallic thermoelectric converters usually operate with better efficiency at or above 200 K in comparison to their efficiency at 190 K as a result of a basic thermodynamic characteristic common to known metals. The critical temperature of methane is unfortunately below 200 K and the TEC has to be consequently operated in the less efficient temperature range of 190 K or below to assure that the methane is liquified.

The computer modelling study was based on measured pressure (PSIA) versus adsorption density (grams sorbate/grams sorbent) isotherms taken for various working fluids and adsorption materials. The adsorption density isotherm curves for the adsorption of krypton on saran carbon is provided as an example in FIG. 2.

In order of their listings, the sorbents of Table 1 are: (a) Amoco GX-31 which is a commercially available granular charcoal having a relatively high adsorption surface area but a relatively large void volume and a relatively poor thermoconductivity in comparison to other materials listed in Table 1; (b) Saran carbon A which is the inert pyrolysis product of a pressurized block of homopolymeric polyvinylidene chloride (PVDC), the latter material being an organic polymer designated by Dow Chemical Company as Saran A; (c) Mycarta charcoal which is the pyrolysis product of a compressed, sprially wound (laminated) phenolic resin; and (d) $(AX-21)_{80}(Saran)_{20}$ which is the pyrolysis product of a compressed mixture of 20% powderred Saran A and 80% granulated Amoco/Anderson AX-21, the latter being a commercially available charcoal.

After pyrolysis, sorbents (b), (c) and (d) can be characterized as monolithic carbon matrices having substantially monolithic macro and microstructures dominated by a large micropore volume (pore diameters of less than 3 nanometers) uniformly distributed throughout and relatively small macropore and void volumes. Because of their monolithic structure, these sorbents can act as efficient thermal conductors for transferring heat between an external heat source and an adsorbed fluid. Saran carbon is relatively expensive to manufacture. It requires approximately 4–5 weeks for production in an inert gas or vacuum at a temperature of approximately 700° C. and a compression pressure prior to pyrolysis of roughly 15000 psi. A description of Saran carbons B and D which are copolymeric cousins of Saran carbon A can be found in *HIGH PRESSURE ADSORPTION OF METHANE ON POROUS CARBONS* by S. S. Barton, J. R. Dacey and D. F. Quinn which paper is printed in *Fundamentals of Adsorption*, edited by Myers and Belfort, Engineering Foundation Press, 345 East 47the Street N.Y, N.Y. 10017. The 80/20 mix of AX-21 and Saran carbon A, (sorbent (d)) is much less expensive because it can be produced in about a week. The Mycarta charcoal typically can be made in one day.

The results of the computer modeling studies are as follows:

TABLE 1

| SORBENT | SPECIFIC POWER (Watts in per each watt of cooling) | COMMENTS |
| --- | --- | --- |
| (a) Amoco GX-31 | 190 | Granular Poor thermoconductivity Large void volume |
| (b) Saran carbon | 80 | Monolithic Good thermoconductivity Large micropore volume and surface area 4–5 weeks to produce |
| (c) Mycarta charcoal | 110 | Monolithic Porous matrix Approx. 1 day to produce |
| (d) $(AX-21)_{80}$ $(Saran\ A)_{20}$ | 100 | Monolithic Porous matrix Approx. 1 |

TABLE 1-continued

| SORBENT | SPECIFIC POWER (Watts in per each watt of cooling) | COMMENTS |
|---|---|---|
| | | week to produce |

Working fluid = Methane
TEC temperature = 190 K.

TABLE 2

| SORBATE | SPECIFIC POWER (Watts in/Watts of cooling) | COMMENTS |
|---|---|---|
| (a) Methane ($CH_4$) | 80* | Requires 190 K. TEC temperature to liquify Substantial decomposition reactions above 675 K. Explosive |
| (b) Krypton (Kr) | 70 | Can be liquified above 200 K. No decomposition |
| (c) Freon 14 ($CF_4$) | 85 | Substantial decomposition above 550 K. |
| (d) Ethylene ($C_2H_4$) | 45 | Substantial decomposition above 450 K. Combustible |

Sorbent = Saran carbon A
TEC temperature = 200 K. except for Methane which was set to 190 K.*

The above tables show that among the sorbates tested, krypton is superior to methane not only in its energy efficiency but also in the fact that krypton is immune to decomposition. Among the sorbents modelled, Saran carbon A had the highest power efficiency but this number should be balanced against the cost of its manufacture. Mycarta charcoal and the AX-21/Saran mixture ran as seconds in terms of energy efficiency but their production times are substantially shorter than that of the Saran carbon. It should be noted that even though Mycarta charcoal was calculated to be less efficient than Saran carbon, Mycarta charcoal is expected to be at least 70% more energy efficient than granular charcoal (e.g. Amoco GX-31). Thus, even the least efficient among the tested monolithic carbon sorbents appears to be preferred over the granular sorbent.

The conclusions reached from the above modelling studies is that krypton can be used advantageously with any suitable sorbent to provide improved performance over methane and that monolithic porous carbons such as Saran carbon A (or B or D), Mycarta charcoal and Saran/AX-21 can provide further improved performance over granular sorbents such as GX-31. Further studies along the lines disclosed here will probably uncover other sorbents that can be combined advantageously with a working fluid containing substantial quantities of krypton. Irrespective of its superior energy efficiency relative to methane, krypton is also desirable because it does not decompose or pose the threat of reacting with other materials in the cryogenic refrigeration environment. Less than pure commercially available krypton is usually contaminated primarily with other noble elements such as xenon (Xe) so that even when substantial amounts of contaminants are present in the working fluid, adverse reactions between the krypton, the other contaminants, and the cryogenic system as a whole are either of an insignificant level or unlikely to occur at all. As such, multiple advantages including improved energy efficiency and system longevity are derived from the utilization of krypton. The scope of the present invention should not be limited to the above detailed description but should rather be defined more broadly in light of its spirit, the accompanying claims and equivalents thereof.

We claim:

1. In a physical adsorption type refrigeration system having a sorbent material, a sorbate fluid capable of being adsorbed onto said sorbent material predominantly by physical adsorption, means for heating said sorbent material to cause the sorbate fluid to be desorbed from said sorbent material, and means for directing the desorbed sorbate fluid away from said sorbent material through an expansion valve, the improvement comprising a sorbate fluid which includes a substantial percentage of krypton, 2. The refrigeration system of claim 1 wherein the sorbate fluid essentially consists of krypton.

3. An adsorption type refrigeration system according to claim 1, wherein the sorbent material comprises a monolithic porous carbon.

4. The refrigeration system of claim 3 wherein the monolithic porous carbon is selected from the group consisting of saran carbon, mycarta charcoal and the pyrolysis product of a mixture of polyvinylidene chloride and granulated charcoal.

5. The refrigeration system of claim 3 wherein said means for heating comprises an electric heater, coupled to pass an electric current directly through the sorbent material to thereby heat the sorbent material.

6. An adsorption type refrigeration system according to claim 1 further comprising a thermoelectric cooler, operatively coupled to a flow path of the sorbate fluid, wherein the thermoelectric cooler operates at a temperature greater than 190.7 degrees Kelvin and less than 209.4 degrees Kelvin.

7. A refrigeration system according to claim 6 further comprising a pressurization chamber enclosing the sorbent material, and pressure control means, coupled to the chamber, for intaking the sorbate fluid into the pressurization chamber at a first pressure level and wherein said means for directing includes means for outletting the sorbate fluid out of the pressurization chamber at a higher second pressure level.

8. The system of claim 7 wherein the first pressure level is approximately 4 atmospheres and the second pressure level is approximately 36 atmospheres.

9. The system of claim 7 further comprising heating means, coupled to the pressurization chamber, for heating the chamber to a high temperature substantially above an intake temperature at which the sorbate fluid enters the pressurization chambers.

10. The system of claim 9 wherein the high temperature is approximately 575 K and the intake temperature is approximately 275 K.

11. A method for improving the energy efficiency of a physical adsorption type refrigerator of the type employing a sorbent material and a sorbate fluid, comprising:
   selecting a sorbate fluid capable of being adsorbed onto said sorbent material predominantly through physical adsorption, said sorbate fluid comprising a substantial percentage of krypton;

providing the sorbate fluid to said sorbent material such that said sorbate fluid is adsorbed onto said sorbent material;

heating the adsorbed sorbate fluid to a temperature above 209 K to thereby gassify the krypton and pressurize the sorbate fluid; and liquefying the sorbate fluid at a temperature above 190 K.

12. The method of claim 11 wherein the heating step includes heating the sorbate fluid to a temperature of approximately 575 K.

13. A two stage cryogenic refrigeration system, comprising:

an upper stage physical adsorption cryogenic refrigeration system, comprising:
  a first sorbent material;
  a first sorbate fluid capable of being adsorbed onto said first sorbent material, said first sorbate fluid including a substantial percentage of krypton;
  means for desorbing the first sorbate fluid from said first sorbent material; and
  means for controlling the flow of the first sorbate fluid away from said first sorbant material to provide expansion and cooling of said desorbed first sorbent fluid; and a lower stage chemisorption cryogenic refrigeration system, comprising:
  a second sorbent material capable of reversibly chemically reacting with oxygen;
  a second sorbate fluid substantially comprised of oxygen;
  means for desorbing the oxygen from said second sorbent material; and
  means for controlling the flow of said desorbed second sorbate fluid away from said second sorbent material so as to provide expansion and cooling of said desorbed second sorbate fluid.

* * * * *